(12) United States Patent
Burke

(10) Patent No.: US 7,277,712 B2
(45) Date of Patent: Oct. 2, 2007

(54) METHOD AND SYSTEM FOR PROVIDING LOCATION INFORMATION FOR EMERGENCY SERVICES

(75) Inventor: Scott B. Burke, Lake Forest Park, WA (US)

(73) Assignee: AT&T Mobility II, LLC, Atlanta, GA (US)

(*) Notice: Subject to any disclaimer, the term of this patent is extended or adjusted under 35 U.S.C. 154(b) by 147 days.

(21) Appl. No.: 10/990,635

(22) Filed: Nov. 17, 2004

(65) Prior Publication Data

US 2006/0105776 A1    May 18, 2006

(51) Int. Cl.
*H04Q 7/20* (2006.01)
(52) U.S. Cl. .................. 455/456.1; 455/456.2; 455/456.3; 455/456.5; 455/456.6
(58) Field of Classification Search ............. 455/456.1, 455/456.2, 456.3, 456.5, 456.6, 13.2, 11.1, 455/12.1, 427, 98
See application file for complete search history.

(56) References Cited

U.S. PATENT DOCUMENTS

| | | | |
|---|---|---|---|
| 5,736,962 A * | 4/1998 | Tendler | 342/357.1 |
| 6,134,316 A * | 10/2000 | Kallioniemi et al. | 379/220.01 |
| 6,330,452 B1 * | 12/2001 | Fattouche et al. | 455/456.1 |
| 6,463,290 B1 * | 10/2002 | Stilp et al. | 455/456.1 |
| 2002/0160791 A1 * | 10/2002 | Markowitz | 455/462 |
| 2005/0136945 A1 * | 6/2005 | Kennedy et al. | 455/456.1 |
| 2005/0192026 A1 * | 9/2005 | Carlson et al. | 455/456.1 |
| 2005/0215233 A1 * | 9/2005 | Perera et al. | 455/411 |
| 2006/0030333 A1 * | 2/2006 | Ward et al. | 455/456.1 |

OTHER PUBLICATIONS

3rd Generation Partnership Project; Technical Specification Group Core Network; Information element mapping between Mobile Station—Base Station System (MS-BSS) and Base Station—Mobile-services Switching Centre (BSS-MSC); Signalling procedures and the Mobile Application Part (MAP) (Release 4), Mar. 2004, Global System for Mobile Communication, 136 pages.
User Description, Synchronized Radio Networks, 105/1553-HSC 103 12/4 Uae, E, Ericsson Radio Systems AB 2002, 20 pages.
Synchronization in 3G Networks Based on the Universal Mobile Telecommunication System (UMTS), Symmetricom, 2004, 11 pages.
3rd Generation Partnership Project; Technical Specification Group Services and System Aspects; Circuit Bearer Services (BS) supported by a Public Land Mobile Network (PLMN) (Release 1999), (Mar. 2000), 11 pages.
3rd Generation Partnership Project; Technical Specification Group GSM/EDGE Radio Access Network; Digital cellular telecommunications system (Phase 2+); Radio subsystem synchronization (Release 1999) (Aug. 2003), Global System for Mobile Communications, 23 pages.

* cited by examiner

*Primary Examiner*—Joseph Feild
(74) *Attorney, Agent, or Firm*—Amin, Turocy & Calvin LLP

(57) ABSTRACT

Emergency Services architecture for determining the location of a wireless caller. The architecture leverages a synchronization feature of GSM networks of the Base Station Subsystem (BSS) to enable employment of sparse networks by removing WLS (Wireless Location Sensor) equipment from selected cell sites. Thus, the location of a wireless caller within a sparse site can be determined. Sparse network location services can be provided further utilizing Time Difference of Arrival (TDOA) technology, and other network-based location technologies such as Enhanced Observed Time Difference (EOTD) and Angle of Arrival (AOA). Hybrid network-based/handset-based location technologies may also be used with the disclosed invention.

37 Claims, 9 Drawing Sheets

| OFFSET TABLE ||||| |
|---|---|---|---|---|---|
| GROUP (G) | G-G TIME | CELL (C) | REFERENCE | REF OFFSET | ... |
| 1 | 1,2: TIME1 | 1-1 | MASTER | - | |
| 1 | | 1-2 | | | |
| 1 | | 1-3 | | | |
| 2 | 2,3: TIME2 | 2-1 | SLAVE | OFFSET1 | |
| 2 | ⋮ | 2-2 | | | |
| 2 | | 2-3 | | | |
| 2 | | 2-4 | | | |
| 3 | 3,X: TIME3 | 3-1 | MASTER | - | |
| ⋮ | | ⋮ | ⋮ | ⋮ | |

FIG. 6

METHOD AND SYSTEM FOR PROVIDING LOCATION INFORMATION FOR EMERGENCY SERVICES

TECHNICAL FIELD

This invention is related to mobile communications networks, and more specifically, implementation of emergency services on the mobile communications networks.

BACKGROUND OF THE INVENTION

Federal law requires that all Personal Communications System networks and mobile communications networks be capable of providing location information for wireless calls made to emergency services. Under Phase II of the Federal Communications Commission wireless E911 mandate, it is required that technology be in place such that a dispatcher can know more precisely where the caller is located, a capability called Automatic Location Information.

Location technologies can be classified into at least three categories, including stand-alone, satellite-based, and terrestrial-based. A stand-alone system need not rely on multiple range measurements to determine the caller's position, but can attempt to provide the location based on power level, for example. Satellite-based systems such as Global Positioning System (GPS) provide very good accuracy and availability; however, impediments to line-of-sight can impact its usefulness. Terrestrial-based systems use existing cellular network base station transceivers (BTS's) for ground-based communications. The BTS transmits multiple ranging signals for a mobile station (or cell phone) in order to determine its location. BTS are added based upon the density of people residing in a certain geographic area. Consequently, more BTS exist in an area of higher population density than in an area of lower population density, which is optimized for communications purposes, and not for location services.

One method of determining the location of a wireless caller via a terrestrial-based system is by Time Difference of Arrival (TDOA) technology. The TDOA technique works based on trilateration by measuring the time of arrival of a mobile station radio signal at three or more separate cell sites. In a cellular system using TDOA, a caller will place an emergency 9-1-1 call that is received at several BTS, although only one BTS is assigned by the network to provide cellular communications service to the caller. A BTS is part of a BSS (Base Station Subsystem), which BSS includes the BTS and a BSC (Base Station Controller). Each BTS receiving the 9-1-1 call signal will pass it through the BSC to a MSC (Mobile Switching Center).

The MSC is part of an NSS (Network and Switching Subsystem), and is a cellular central office that can perform all switching and signaling for cellular telephones in the MSC's area by routing calls between the mobile network and the fixed telephone network (e.g., the PSTN-Public Switched Telephone Network). TDOA equipment at the MSC will determine the difference in time that the 9-1-1 signal arrived at each of three or more BTS sites and calculate the latitude and longitude of the caller based on the time difference and triangulation. The MSC then forwards the 9-1-1 call, along with the caller's location, to the emergency services dispatcher at a correct Public Safety Answering Point (PSAP).

One current method of implementing TDOA location technology in wireless networks requires that the BTS have the capability to determine timing information for received signals. In support thereof, a Wireless Location Sensor (WLS) can be located at each BTS. The WLS measures features of the wireless mobile station radio signals and transmits the 9-1-1 call signal information to a Geolocation Control System (GCS) that is also located at the MSC. The GCS is a central location processor that manages, coordinates, and administers the WLS network. The GCS converts the radio signal information received from the WLS into latitude/longitude data and communicates the data to the PSAP for deployment of emergency services.

However, providing a WLS at each BTS is very expensive due to equipment, installation, and maintenance costs. Accordingly, there is an unmet need for an improved emergency wireless caller location system.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises architecture for determining the location of a wireless caller. The architecture leverages a synchronization feature of GSM networks of the Base Station Subsystem (BSS) to enable employment of sparse networks by removing WLS (Wireless Location Sensor) equipment from selected cell sites.

In another aspect of the subject invention, sparse network location services can be provided further utilizing Time Difference of Arrival (TDOA) technology, and other network-based location technologies such as Enhanced Observed Time Difference (EOTD) and Angle of Arrival (AOA). Hybrid network-based/handset-based location technologies may also be used with the disclosed invention.

In yet another aspect thereof, an offset table can be employed at a MSC (Mobile Switching Center) for access by a GCS (Geolocation Control System) for automated determination of offset information by the GCS for location determination of a wireless caller in a sparse cell.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 6 illustrates an exemplary table of offsets that can be employed with the GCS in accordance with the invention.

DETAILED DESCRIPTION OF THE INVENTION

Figure 1:
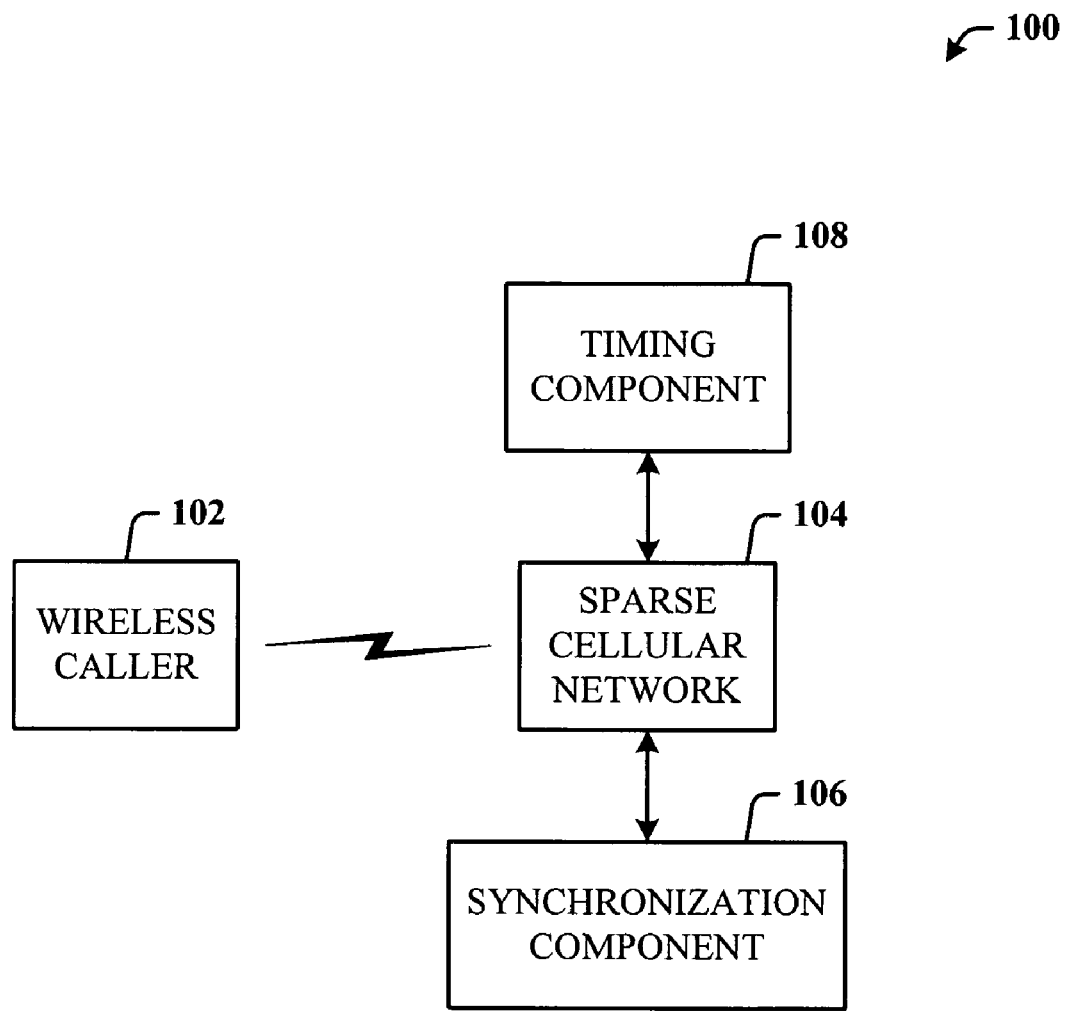
FIG. 1 illustrates a system that facilitates location determination of a wireless caller in accordance with the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Caller Location System

The caller location system overlays standard cellular networks to provide emergency services by locating a wireless caller that made a 9-1-1 call. Significant costs associated with such emergency systems can be reduced by eliminating a wireless location sensor (WLS) device at one or more base transceiver stations (BTSs) of the cellular network. By providing a WLS only where absolutely necessary, the system need only to ensure that one of the BTS receiving the 9-1-1 call has a WLS to provide timing information. The timing information is forwarded via the BSS (Base Station Subsystem), which includes the BTS and a BSC (Base Station Controller) to the MSC (Mobile Switching Center) equipment. A GCS (Geolocation Control System) at the MSC can process the radio signals received from the wireless caller and determine the caller's latitude/longitude data, as long as the MSC can determine the time difference between the arriving BTS reports and obtain timing information from one WLS at a BTS that received the 9-1-1 call. Therefore, it is possible to omit WLS from some BTS. As used herein, "sparsing" the network is intended to mean eliminating a WLS at a BTS (or cell site). A BTS without a WLS is referred to hereinafter as a sparse site, and a BTS with a WLS is referred to as a non-sparse site.

In practice, however, it is difficult to determine which BTS are good sparsing candidates due to one set of requirements that at least three BTS receive the 9-1-1 call for triangulation calculations, and precise timing of the site must be known or detected by the location system. Previous sparsing methods have resulted in less than 5% of BTS being sparsed.

One implementation at sparsing requires that a surrounding cell (or non-sparse site) was employed detect a BCCH (BroadCast CHannel) of the sparse site to get timing information. However, such an implementation is less productive than desired.

Another implementation, described in detail herein, forces timing synchronization between a non-sparse site and the sparse site, instead of detecting timing information from the BCCH. This implementation offers a significant reduction in costs while meeting the FCC E911 emergency requirements.

When Time Difference of Arrival (TDOA) technology is employed, triangulation is used to locate the wireless caller. Thus, three or more non-sparse sites must receive the caller signal when calling from the sparse site in order for triangulation to work. Other network-based location technologies such as Enhanced Observed Time Difference (EOTD) and Angle of Arrival (AOA) may be used with the disclosed invention, as well as hybrid network-based/handset-based location technologies.

In order to provide location services in such sparse networks, timing information is required from each BTS that receives the wireless call. This timing information must be based on a common timing scale, thus cell synchronization is imposed. One such methodology is synchronization of the BSS which can be used in GSM (Global System for Mobile Communications) networks. By providing BSS synchronization in a sparse site and a non-sparse site, for example, timing information can be ascertained and used to convert mobile station radio signals to latitude/longitude data which defines the location of the wireless caller.

GSM radio networks utilize synchronization to synchronize the transmission of bursts within a cell site. This ensures that intra-cell co-channel interference is non-existent within a cell during frequency hopping across channels. Thus, channels transmitted within a cell are synchronized so that they are not transmitted on the same frequency at the same time. A synchronized radio network includes cells that are synchronized to a common reference such as geographic location system (e.g., (GPS) Global Positioning System). Such synchronization technology can be found in technical specification document 3GPP TS 05.10 V8.12.0 (2003-08) entitled 3$^{rd}$ GENERATION PARTNERSHIP PROJECT; TECHNICAL SPECIFICATION GROUP GSM/EDGE RADIO ACCESS NETWORK-RADIO SUBSYSTEM SYNCHRONIZATION (RELEASE 1999), the entirety of which is hereby incorporated by reference.

Accordingly, FIG. 1 illustrates a system 100 that facilitates location determination of a wireless caller 102 in accordance with the subject invention. A sparse cellular network 104 is provided whereby one or more cells of the network 104 include BTS where the WLS is removed. A synchronization component 106 facilitates cell site synchronization of the sparse site(s) and a non-sparse site. Thus, timing information can be obtained using a timing component 108 that when converted accurately defines the geographic location by longitude/latitude data of the wireless caller. When used in conjunction with GPS technology, the longitude/latitude data can be quickly and accurately determined.

Figure 2:
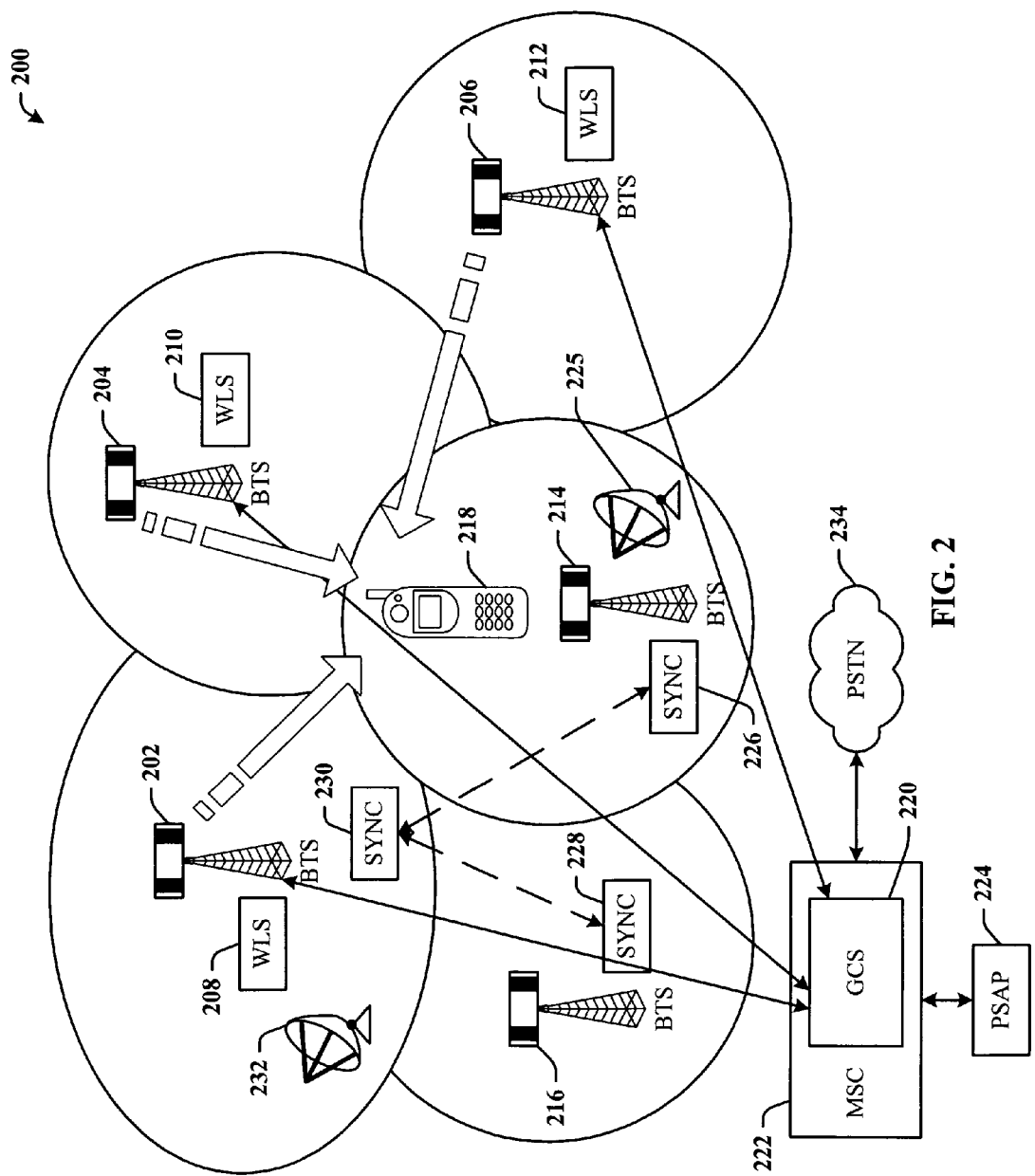
FIG. 2 illustrates depicts a cellular system that employs sparse network location determination in accordance with the invention.

FIG. 2 depicts a cellular system 200 that employs sparse network location determination in accordance with the invention. A cell group is shown having five cells, each have a BTS site, for example, although cell group size can be more or less cells than are shown. Moreover, each cell can employ more than one BTS. Three cells (denoted with the corresponding BTS 202, 204 and 206, and also to the respective cells) are non-sparse sites in that each BTS (202, 204, and 206) includes a corresponding WLS (208, 210, and 212) such that timing information can be determined at each non-sparse site (202, 204, and 206). The remaining two cells are a first sparse site 214 and a second sparse site 216, since neither includes a WLS.

In this particular example, TDOA is employed, such that three or more non-sparse sites must receive the call signals from a wireless caller 218 located in the sparse site 214 for trilateration to work. Note that the number of sparse sites depicted in this example (i.e., two), is only an example of the number of sparse sites that can be employed. A fewer or greater number of sparse sites can be used. For example, if the terrain and coverage allows, a greater number of sparse sites can be accommodated for synchronization. The non-sparse sites (202, 204 and 206) communicate with a GCS 220 at an MSC 222 via the respective BTS. The MSC 222 is in communication with a Public Safety Answering Point (PSAP) such that the location information can be communicated thereto and the caller can obtain emergency services.

In this particular implementation, the sparse sites (214 and 216) are synchronized to the non-sparse site 202. The first sparse site 214 is synchronized using a first synchronization component 226, and the second sparse site 216 is synchronized using a second synchronization component 228, both of which synchronize to the non-sparse site synchronization component 230. Although not shown as such, the BTS, WLS, and synchronization component 230 for the non-sparse site 202 are interconnected for communications purposes. This is also true for any site that includes a WLS, BTS, and/or additional equipment. The non-sparse site 202 can employ GPS satellite capability via a GPS satellite receiver 232 to communicate with a GPS system (not shown) such that the non-sparse site 202 can determine the timing information directly via the WLS 208, and then use the timing information to compute the longitude/latitude information via the GPS satellite to the GPS system. The longitude/latitude information can then be communicated to the PSAP 224 by way of the GCS 220 and MSC 222.

It is to be appreciated that the synchronization components (226, 228, and 230) can include the BSC, such that synchronization exists through the BSC to the BTS. Moreover, where provided, the synchronization components (226 and 230) can also include the respective satellite receivers (225 and 232) which function as a common reference for all components at that cell. In one implementation, synchronization is derived from the PSTN (Public Switched Telephone Network) 234 at the MSC 222, and distributed through the rest of the network using, for example, E1 links carried over PDH (Plesiochronous Digital Hierarchy) or SDH (Synchronous Digital Hierarchy) systems. Clocks at each of the network elements (e.g., BTS, BSC, MSC, and so on) can be aligned with the GPS satellite system as a reference to ensure network synchronization.

Figure 3:
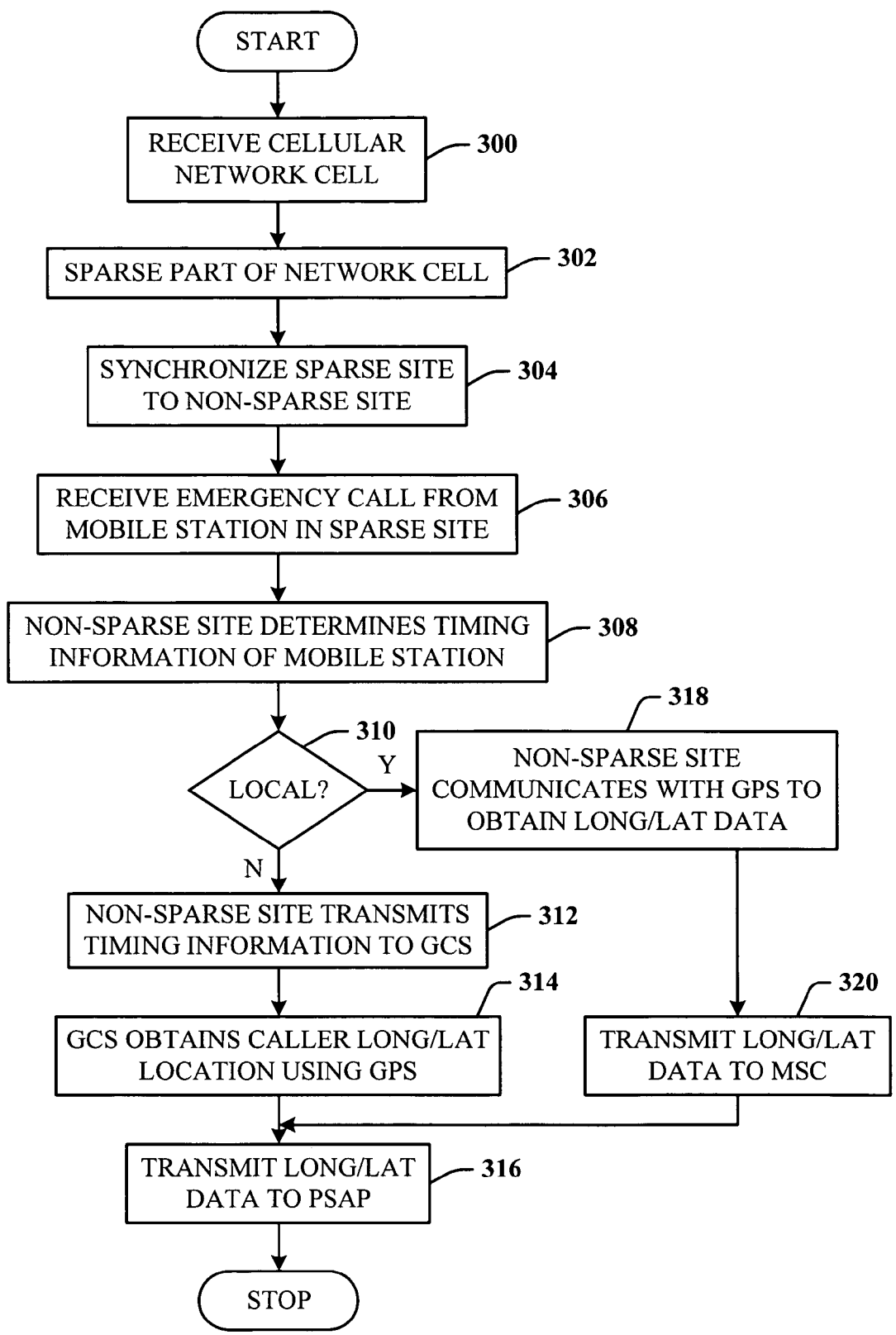
FIG. 3 illustrates a methodology of wireless caller location determination in accordance with the invention.

FIG. 3 illustrates a methodology of wireless caller location determination in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 300, an existing cellular network is received for emergency location services. At 302, the network cell is selected and sparsed. At 304, the sparse site(s) is synchronized to a non-sparse site. At 306, an emergency call is received by a mobile station in the sparse site. At 308, the WLS at the non-sparse site captures the timing information. At this point, in one implementation, the timing information is processed remotely. Accordingly, at 310, the decision is made to process remotely. At 312, the non-sparse site transmits the timing information to the GCS. The GCS then obtains the caller longitude/latitude location via GPS. At 316, the longitude/latitude data is then transmitted to the PSAP such that emergency services can be dispatched to the caller.

Alternatively, at 310, the timing information can be processed locally at the site. Accordingly, at 318, the non-sparse site includes its own GPS communications capability such that the corresponding longitude/latitude data can be obtained. At 320, the longitude/latitude data is then transmitted to the MSC, and from there, to the PSAP, as indicated at 316.

Figure 4:
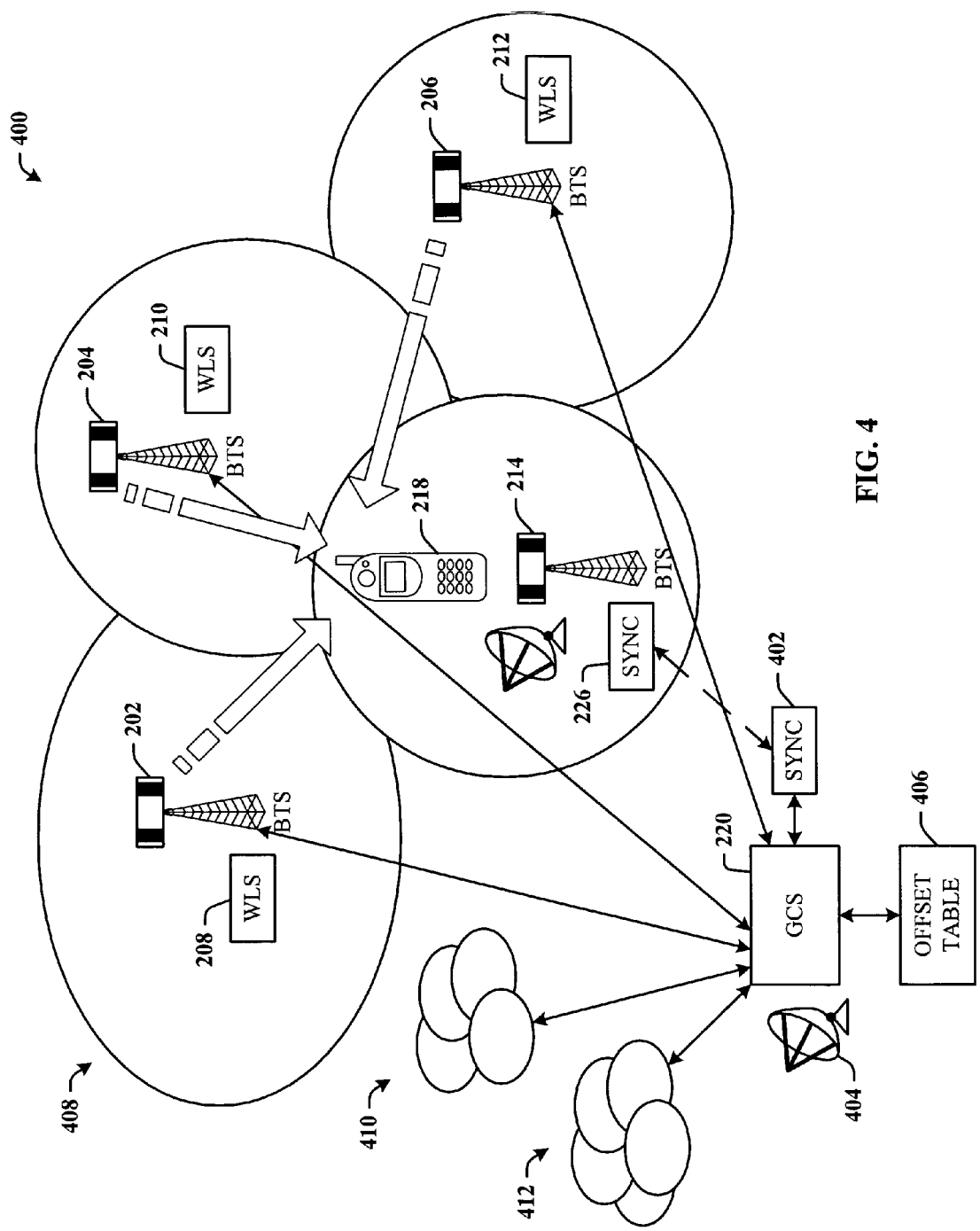
FIG. 4 illustrates an alternative cellular system for wireless caller location determination in accordance with the invention.

FIG. 4 illustrates an alternative cellular system 400 for wireless caller location determination in accordance with the invention. In this particular embodiment, the sparse site synchronizes with the GCS, rather than a non-sparse site, as described in FIG. 2. In this example, the network cell comprises four sites; the three non-sparse sites (202, 204, and 206), and the first sparse site 214. The non-sparse sites (202, 204, and 206) have corresponding WLS units (208, 210, and 212). The sparse site 214 has its WLS removed, in accordance with the process of sparsing the network. However, the sparse site 214 includes the first synchronization component 226 for synchronizing with a GCS synchronization component 402 in communication with the GCS 220. Additionally, a satellite receiver 404 or other communications means is associated with the GCS 220 to provide GPS capability for obtaining the longitude/latitude information of the mobile station 218.

In this particular embodiment, since synchronization to the sparse site 214 is performed by the GCS 220, a synchronization offset table 406 is provided. The table 406 stores offsets for each BTS of several network cells (also called synch groups). For example, if there are three synch groups (408, 410, and 412) of differing offsets (e.g., 1, 2, and 3), the table 406 can be accessed by the GCS 220 so that the corresponding sparse site (here, sparse site 214 of synch group 408) can be referenced.

Figure 5:
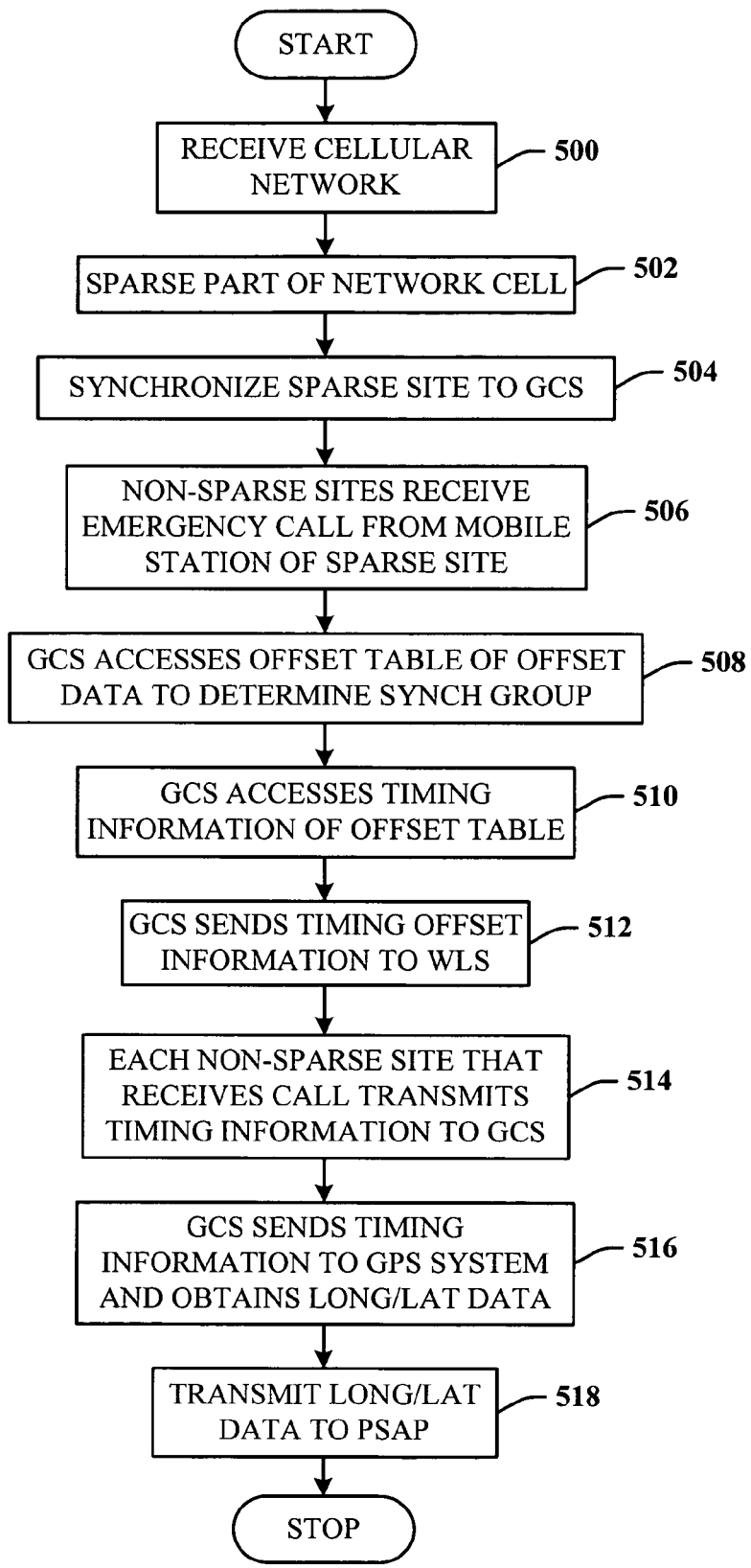
FIG. 5 illustrates an alternative methodology of wireless caller location determination in accordance with the invention.

FIG. 5 illustrates an alternative methodology of wireless caller location determination in accordance with the invention. At 500, an existing cellular network is received for overlay of an emergency location services network. At 502, a network cell of the cellular network is selected and sparsed. At 504, the sparse site(s) is synchronized to the GCS synchronization component of the GCS site. At 506, an emergency call is received by a mobile station in the sparse site. At 508, the GCS accesses the offset table of offset data to determine the synch group. At 510, the GCS accesses timing information in the offset table. At 512, the GCS sends timing offset information to the WLS. At 514, each non-sparse site that receives the call transmits timing information to the GCS, as derived by the WLS at each site. At 516, the GCS sends the timing information to a GPS system and obtains the longitude/latitude data. At 518, the longitude/latitude data is transmitted to the PSAP.

FIG. 6 illustrates an exemplary table 600 of offsets that can be employed with the GCS in accordance with the invention. The table 600 provides quick and automatic access to timing information related to cell groups and reference sources. For example, depicted in the table 600 is information related to at least three cell groups (or such groups); a first cell group (GROUP 1), a second cell group (GROUP 2), and partial information of a third cell group (GROUP 3). The first cell group includes three cells (1, 2, 3—denoted as 1-1, 1-2, and 1-3) and the second cell group includes four cells (1, 2, 3, 4—denoted as 2-1, 2-2, 2-3, and 2-4). Thus, timing information can include group-to-group (G-to-G) differential times (e.g., 1,2:TIME1) for group offset times between the first and second groups, and (e.g., 2,3:TIME2) for time between the second and third groups.

Another column can be included that provides the reference source (e.g., a master source and a slave source) and offset delays between the slave to the master. In the exemplary table 600, the first synch group utilizes a reference which is a master. This can be timing referenced directly from GPS or other highly accurate timing source. The second synch group obtains timing from a slave source. This can be an atomic clock such as rubidium atomic standard or an oven-controlled crystal oscillator (OCXO), for example, that slaves to the master periodically to ensure accurate timing is achieved for the second synch group. Thus, another column (denoted REF OFFSET) in the table 600 can include the offset of the slave source from the master source (denoted OFFSET1) for the second synch group. The third synch group is illustrated as using the same master source as the first synch group. Each of the masters will have an offset of zero from itself, as reflected in the REF OFFSET column. It is to be appreciated that the table 600 can include many other types of timing information suitable for determining location of the mobile station in accordance with the subject invention.

Figure 7:
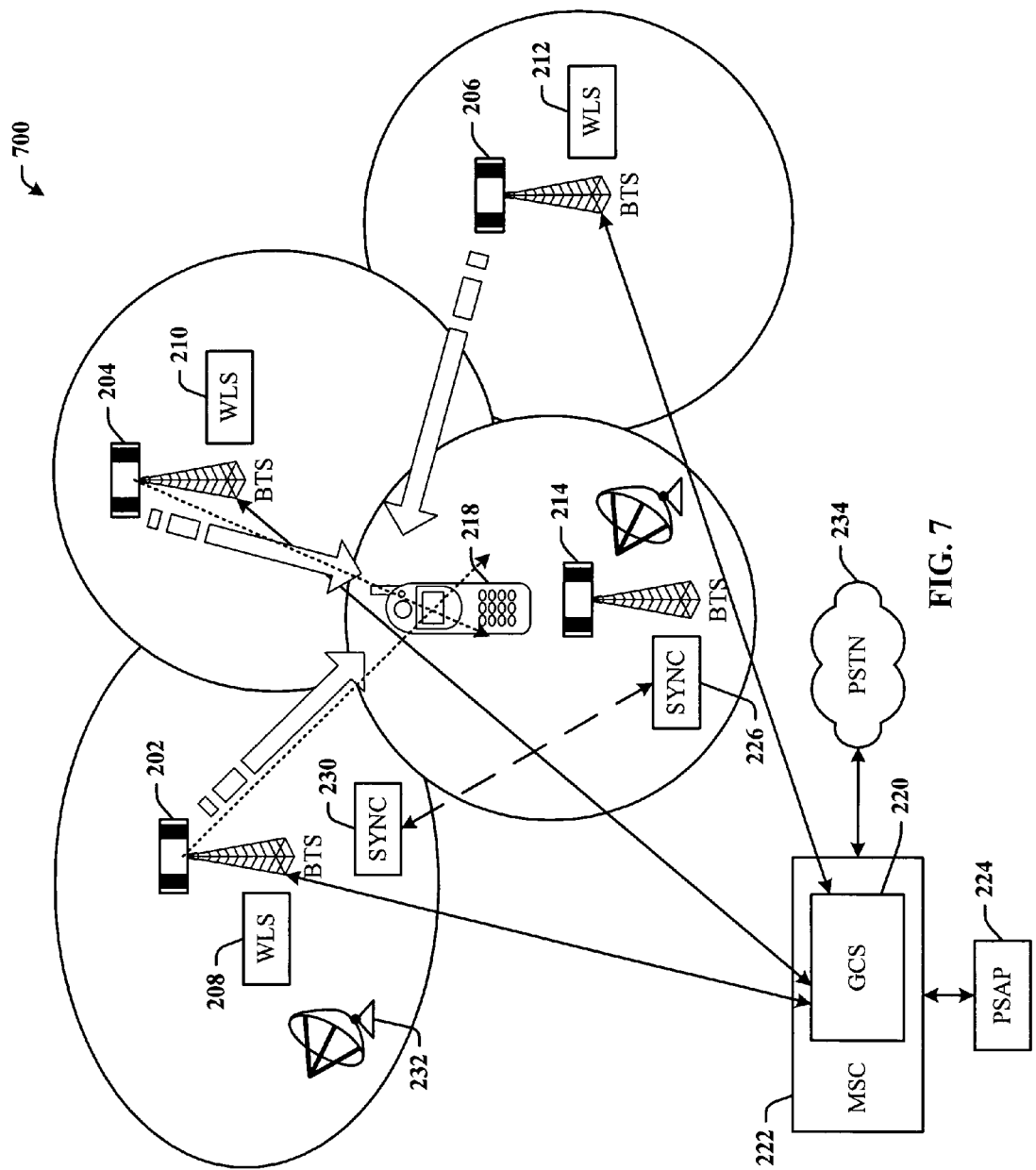
FIG. 7 illustrates a system that employs TDOA and/or AOA technology for wireless caller location in accordance with the invention.

FIG. 7 illustrates a system 700 that employs TDOA and/or AOA technology for wireless caller location in accordance with the invention. The implementation of TDOA as an overlay emergency system has been described hereinabove. AOA technology determines the direction of arrival of a handset signal at the cell site. The intersection of the angles from two sites can provide the location information of the wireless caller. Moreover, TDOA can be augmented with AOA to improve coverage and accuracy. In one implementation, AOA is used to locate the mobile station of the wireless caller. The intersection of the angles from two sites can provide the location information. In another implementation, a combination of TDOA and AOA can generate an accurate location computation of a caller signal from at least two sites.

Accordingly, the system 700 includes the non-sparse sites (202, 204 and 206) two of which (sites 202 and 204) include AOA technology (as indicated by the dotted lines) to locate the mobile station 218 in the sparse site 214. The first and/or second non-sparse sites (202 and/or 204) can receive the intersection location information. Note that all of the non-sparse site (202, 204, and 206) can include the AOA technology; however, only two sites need "see" the mobile station. In one implementation, the intersecting angle information is processed at the non-sparse site 202, and the longitude/latitude obtained directly from a GPS system (not shown) via the satellite system 232 and transmits it to the PSAP 224 via the GCS 220. In another implementation, the intersecting angle information is transmitted to the GCS 220, and the GCS 220 obtains the longitude/latitude directly from the GPS system for transmission to the PSAP 224.

In yet another implementation, both the intersecting angle information, and the timing information (in accordance with synchronization of sparse site 214 with non-sparse site 202 via synchronization components 226 and 230) obtained by the WLS 208 at non-sparse site 202, are processed at the site 202 in order to obtain the longitude/latitude directly from the GPS system for transmission to the PSAP 224 via the MSC 222. In still another implementation, both the intersecting angle information and the timing information are transmitted to the GCS 220 for processing and obtaining of the longitude/latitude from the GPS system for transmission to the PSAP 224.

Figure 8:
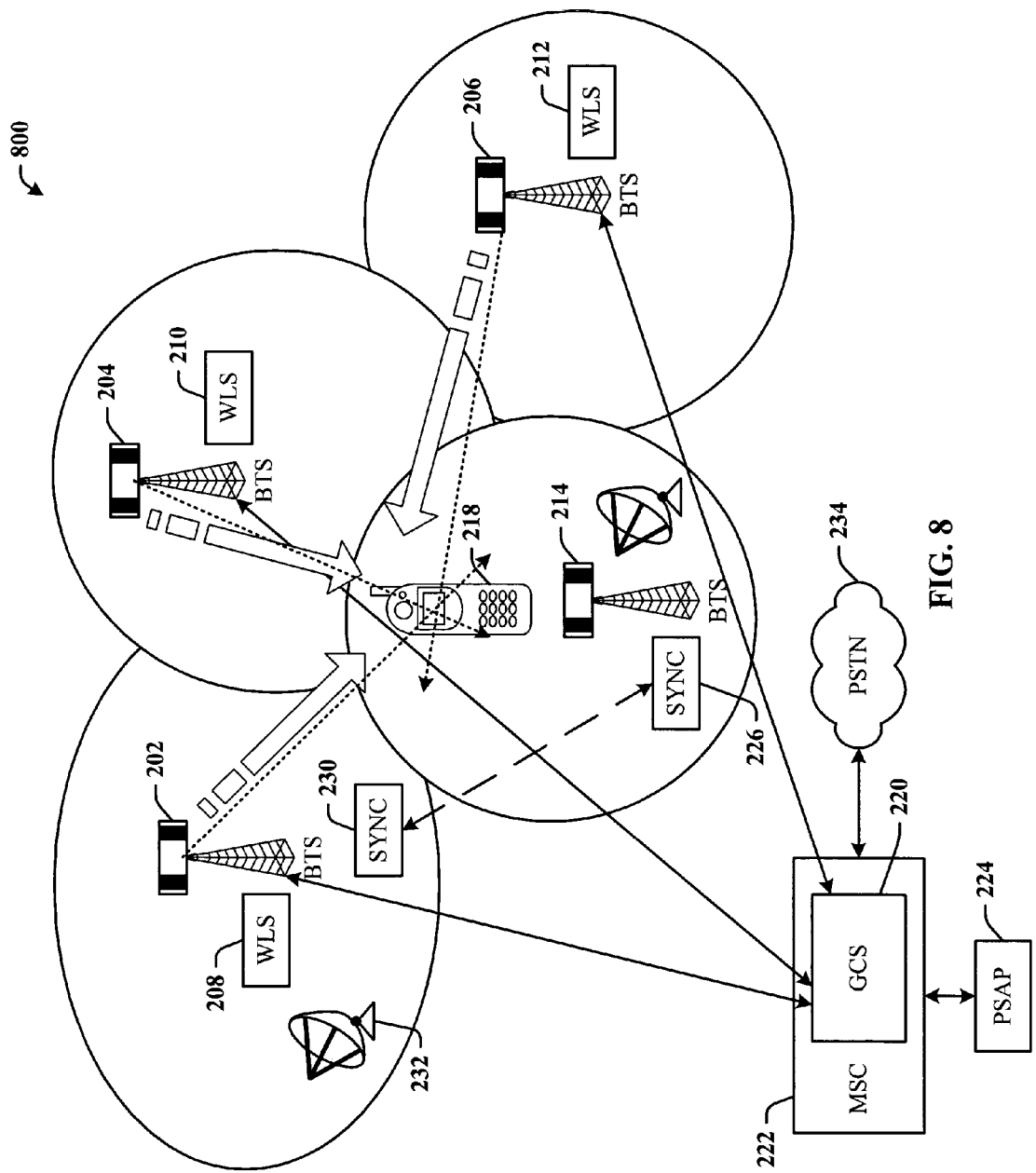
FIG. 8 illustrates a location services system that utilizes EOTD in accordance with the subject invention.

FIG. 8 illustrates a location services system 800 that utilizes EOTD in accordance with the subject invention. EOTD can use up to four cellular BTS to pinpoint a cell phone's (or mobile station) location by measuring the arrival times of the call at various cellular BTS. EOTD relies on software packaged into the cell phone. But in rural areas, the BTS's can be miles apart. Thus, instead of four BTS, it is likely there will be just two BTS to help determine the location the location of the wireless caller.

EOTD is based on an existing feature in GSM stations called Observed Time Difference (OTD), which utilizes the mobile station to calculate the time difference between signals received from two different BTS. The EOTD extends the OTD by incorporating another time difference to determine synchronization of the BTS in the GSM network.

Accordingly, the system 800 includes the non-sparse sites (202, 204 and 206) all of which support EOTD technology to locate the mobile station 218 in the sparse site 214. The first non-sparse site 202 includes the synchronization component 230 which forces synchronization on the sparse site 214. The non-sparse sites (202, 204 and 206) transmit signals to the mobile station 218 (as indicated by the dotted lines), in response to which the mobile station 218 computes the time difference of the received signals. In one implementation, the mobile station 218 transmits the time difference information to the non-sparse site 202, and the longitude/latitude is obtained directly from a GPS system (not shown) via the satellite system 232 for transmission to the PSAP 224 via the GCS 220 at the MSC 222. In another implementation, the mobile station 218 transmits the time difference information to the non-sparse site 202 which forwards it to the GCS 220. The GCS 220 then obtains the longitude/latitude directly from the GPS system for transmission to the PSAP 224.

Figure 9:
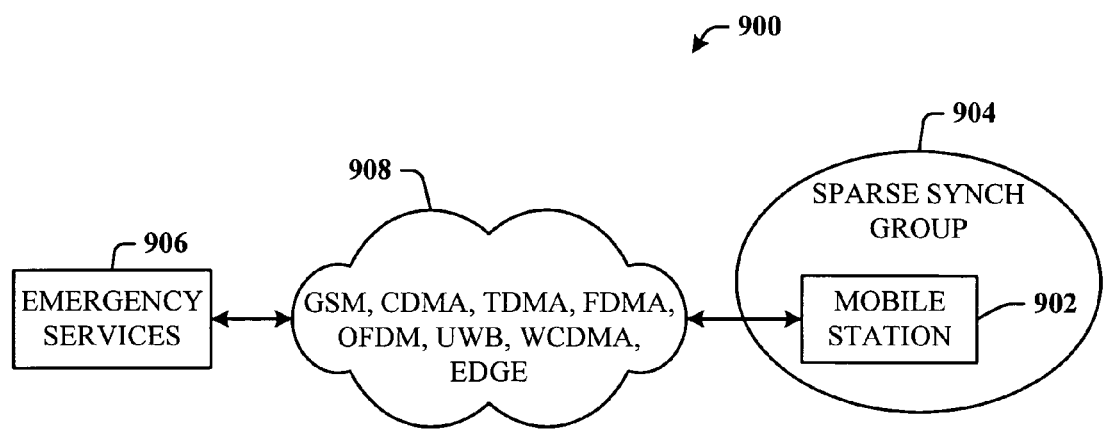
FIG. 9 illustrates a generalized cellular system that supports one or more wireless communications networks that user air interfaces for location service in accordance with the invention.

FIG. 9 illustrates a generalized cellular system 900 that supports one or more wireless communications networks that user air interfaces for location service in accordance with the invention. As previously indicated, the sparse networking location architecture of the subject invention can be overlaid on many different types of cellular networks. A mobile station 902 initiating a wireless call in a sparse cell 904 can be located, and emergency services provided thereto via a network 908. The network 908 can be the following: GSM, CDMA (Code Division Multiple Access), TDMA (Time Division Multiple Access), FDMA (Frequency Division Multiple Access), OFDM (Orthogonal Frequency Division Multiplexing), UWB (Ultra-Wideband), WCDMA (Wideband CDMA), and EDGE (Enhanced Data for GSM Evolution), for example, just to name a few.

With respect to WCDMA (also known as UMTS-Universal Mobile Telecommunications System), which is asynchronous, a mobile station can detect timing information from the primary code sequence on the uplink from a neighboring site. On the downlink side, the mobile station searches for a certain sequence of bits to determine that the carrier network is based on CDMA. Further detection by the mobile station gives the start bits for pulses, and then the scrambling code for that sector, and the key to start applying the across the bits to find the pilot signal. Once the pilot signal is detected, the mobile station is linked up.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates determination of a location of a mobile station, comprising:
    a cellular communications network that is sparsed to include at least one sparse transceiver station from which the mobile station communicates radio signals;
    a synchronization component that facilitates synchronization of the at least one sparse transceiver station with a non-sparse transceiver station; and
    a timing component that determines timing information of the non-sparse transceiver station and facilitates calculation of the location of the mobile station based on the timing information.

2. The system of claim 1, wherein the cellular communications network is at least one of a code division multiple access (CDMA), time division multiple access (TDMA), frequency division multiple access (FDMA), orthogonal frequency division multiplexing (OFDM), and ultra-wideband (UWB) technology.

3. The system of claim 1, wherein the timing component includes a wireless location sensor (WLS) that facilitates determination of the timing information.

4. The system of claim 1, wherein the synchronization component facilitates synchronization of the at least one transceiver station via a base station controller (BSC).

5. The system of claim 1, wherein the timing information is utilized to determine at least one of latitude data and longitude data associated with the location of the mobile station.

6. The system of claim 1, wherein the location is determined using a GPS (Global Positioning System) technology.

7. The system of claim 1, wherein the synchronization component uses GPS technology as a timing reference for at least one of the synchronization component and the timing component.

8. The system of claim 1, wherein the non-sparse transceiver station utilizes GPS to determine the location of the mobile station.

9. The system of claim 1, wherein the sparsed transceiver station lacks a wireless location sensor.

10. The system of claim 1, wherein the timing information is transmitted to a remote GCS for determination of the location information of the mobile station.

11. The system of claim 10, wherein the GCS communicates with a GPS system to compute latitude/longitude data that represents the location of the mobile station.

12. The system of claim 1, wherein the timing information is based upon time difference of arrival (TDOA) technology.

13. The system of claim 1, wherein the timing information is based upon enhanced observed time difference (EOTD) technology.

14. The system of claim 1, wherein the timing information is based upon angle of arrival (AOA) technology.

15. The system of claim 1, wherein the timing information is based upon a hybrid network-based/handset-based location technology.

16. A system that facilitates determination of a location of a mobile station, comprising:
    a sparse site from which the mobile station transmits radio signal information; and
    a synchronization component that facilitates synchronization of the sparse site with a geolocation system, which geolocation system processes the radio signal information and determines the location of the mobile station using timing information from a non-sparse site.

17. The system of claim 16, wherein the location is determined according to longitude and latitude data.

18. The system of claim 16, wherein the geolocation system communicates with a GPS system to obtain longitude and latitude data that defines the location of the mobile station.

19. The system of claim 16, further comprising the non-sparse site that includes a timing system which provides the timing information used by the sparse site, which non sparse site is synchronized with the sparse site such that the timing information is transmitted to the geolocation system to determine the location of the mobile station.

20. The system of claim 19, wherein the geolocation system communicates with a GPS system to obtain longitude and latitude data that defines the location of the mobile station.

21. The system of claim 16, further comprising the non-sparse site that includes a timing system which provides the timing information used by the sparse site, which non sparse site is synchronized with the sparse site such that the timing information is utilized at the non-sparse site to determine longitude and latitude data that defines the location of the mobile station.

22. The system of claim 16, further comprising the non-sparse site that includes a timing system which provides the timing information used by the sparse site, which timing information is associated with at least one of TDOA, AOA, and EOTD technology.

23. A method of determining a location of a mobile station, comprising:
    sparsing a network of transceiver stations to create at least one sparse transceiver station and at least one non-sparse transceiver station;
    synchronizing the at least one sparse transceiver station using a synchronization technology;
    determining timing information associated with the mobile station; and
    calculating the location of the mobile station based in part upon the timing information.

24. The method of claim 23, wherein the timing information is based upon at least one of TDOA and AOA technology.

25. The method of claim 23, wherein the timing information is based upon EOTD technology.

26. The method of claim 23, wherein the timing information is based upon a hybrid network-based/handset-based location technology.

27. The method of claim 23, further comprising transmitting the timing information to a remote system to determine latitude/longitude information of the mobile station.

28. The method of claim 27, wherein the remote system is a GCS.

29. The method of claim 28, wherein the GCS accesses an offset table of timing information which relates to each transceiver station.

30. The method of claim 23, further comprising synchronizing the at least one sparse transceiver station to the at least one non-sparse transceiver station.

31. The method of claim 23, wherein the act of determining is performed at the at least one non-sparse transceiver station.

32. The method of claim 23, further comprising accessing an offset table that includes timing offsets of the transceiver stations of the network.

33. A method of determining a location of a mobile station, comprising:
sparsing a cellular network of cell site to create at least one sparse cell site and at least one non-sparse cell site;
synchronizing the at least one sparse cell site with a non-sparse cell site;
determining timing information associated with the mobile station at the non-sparse cell site; and
calculating the location of the mobile station based in part upon the timing information.

34. The method of claim 33, further comprising accessing a GPS system from the non-sparse cell site to compute longitude/latitude data associated with the mobile station location.

35. A method of determining a location of a mobile station, comprising:
sparsing a group of transceiver sites to create at least one sparse transceiver site and at least one non-sparse transceiver site;
synchronizing the at least one sparse transceiver site with one of the non sparse transceiver stations to determine timing information;
transmitting a call from the at least one sparse transceiver site; and
calculating latitude/longitude information of the mobile station in the sparse site at a GCS based in part upon the timing information.

36. The method of claim 35, further comprising accessing a GPS system at the GCS to determine the latitude/longitude information of the mobile station.

37. The method of claim 35, further comprising referencing the at least one sparse transceiver site and one of the non sparse transceiver stations using GPS technology.

* * * * *